(12) United States Patent
Wadas et al.

(10) Patent No.: US 6,997,074 B2
(45) Date of Patent: Feb. 14, 2006

(54) PREDICTION OF DESTINATION GEAR FOR PROGRESSIVE SHIFT FEATURE

(75) Inventors: David L. Wadas, Kalamazoo, MI (US); Yin-Keat Loh, Selangor (MY)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 10/697,747

(22) Filed: Oct. 30, 2003

(65) Prior Publication Data

US 2005/0096180 A1 May 5, 2005

(51) Int. Cl.
F16H 59/00 (2006.01)

(52) U.S. Cl. ...................................... 74/335
(58) Field of Classification Search .................. 74/335, 74/745; 477/908
See application file for complete search history.

(56) References Cited

U.S. PATENT DOCUMENTS

| | | | |
|---|---|---|---|
| 3,105,395 A | 10/1963 | Perkins | |
| 3,429,202 A | 7/1966 | Galicher | |
| 4,361,060 A | 11/1982 | Smyth | |
| 4,361,065 A | 11/1982 | Wilcox et al. | |
| 4,455,883 A | 6/1984 | Radcliffe | |
| 4,550,627 A | 11/1985 | Lauer et al. | |
| 4,561,325 A | 12/1985 | Jester | |
| 4,595,986 A | 6/1986 | Daubenspeck et al. | |
| 4,663,725 A | 5/1987 | Truckenbrod et al. | |
| 4,722,248 A | 2/1988 | Braun | |
| 4,754,665 A | 7/1988 | Vandervoort | |
| 4,920,815 A | 5/1990 | Reynolds | |
| 4,944,197 A | 7/1990 | Stine et al. | |
| 5,000,060 A | 3/1991 | Reynolds et al. | |
| 5,038,627 A | 8/1991 | Schwaiger et al. | |
| 5,053,961 A | 10/1991 | Genise | |
| 5,054,591 A | 10/1991 | Braun | |
| 5,193,410 A | 3/1993 | Stine et al. | |
| 5,222,404 A | 6/1993 | Stine | |
| 5,272,931 A | 12/1993 | Daniel | |
| 5,335,566 A | 8/1994 | Genise et al. | |
| 5,368,145 A | 11/1994 | Davis | |
| 5,370,013 A | 12/1994 | Reynolds et al. | |
| 5,390,561 A | 2/1995 | Stine | |
| 5,435,212 A | 7/1995 | Menig | |
| 5,582,558 A | 12/1996 | Palmeri et al. | |
| 5,651,292 A | 7/1997 | Genise | |
| 5,661,998 A | 9/1997 | Genise | |
| 5,682,790 A | 11/1997 | Genise | |
| 5,743,143 A | 4/1998 | Carpenter et al. | |
| 5,755,639 A | 5/1998 | Genise et al. | |
| 5,766,111 A | 6/1998 | Steeby et al. | |
| 5,791,189 A | 8/1998 | Newbigging | |

(Continued)

Primary Examiner—Dirk Wright
(74) Attorney, Agent, or Firm—Rader, Fishman & Grauer PLLC

(57) ABSTRACT

A system and method for predicting a destination gear for engine and transmission control is described. Auxiliary splitter section (16B) shifts are automatically implemented by a splitter shifter (28) under commands (56) from a controller (54). The controller (54) includes logic rules for determining an expected front box gear and determining whether an intended shift is one of a button shift and a compound shift. When a compound shift is intended, a shift lever lateral position, a shift lever fore-aft position, and a splitter switch position are used to determine the predicted destination gear. The controller (54) can use the predicted destination gear for engine and splitter control. It is emphasized that this abstract is submitted with the understanding that it will not be used to interpret or limit the scope or meaning of the claims.

20 Claims, 10 Drawing Sheets

U.S. PATENT DOCUMENTS

| | | |
|---|---|---|
| 5,893,292 A | 4/1999 | Lanting |
| 5,904,635 A | 5/1999 | Genise et al. |
| 5,911,787 A | 6/1999 | Walker |
| 5,938,711 A | 8/1999 | Steeby et al. |
| 5,974,906 A | 11/1999 | Stine et al. |
| 5,989,155 A | 11/1999 | Wadas et al. |
| 6,007,455 A | 12/1999 | Steeby |
| 6,015,366 A | 1/2000 | Markyvech et al. |
| 6,044,721 A | 4/2000 | Genise |
| 6,319,171 B1 * | 11/2001 | Hughes et al. ............... 477/111 |

* cited by examiner

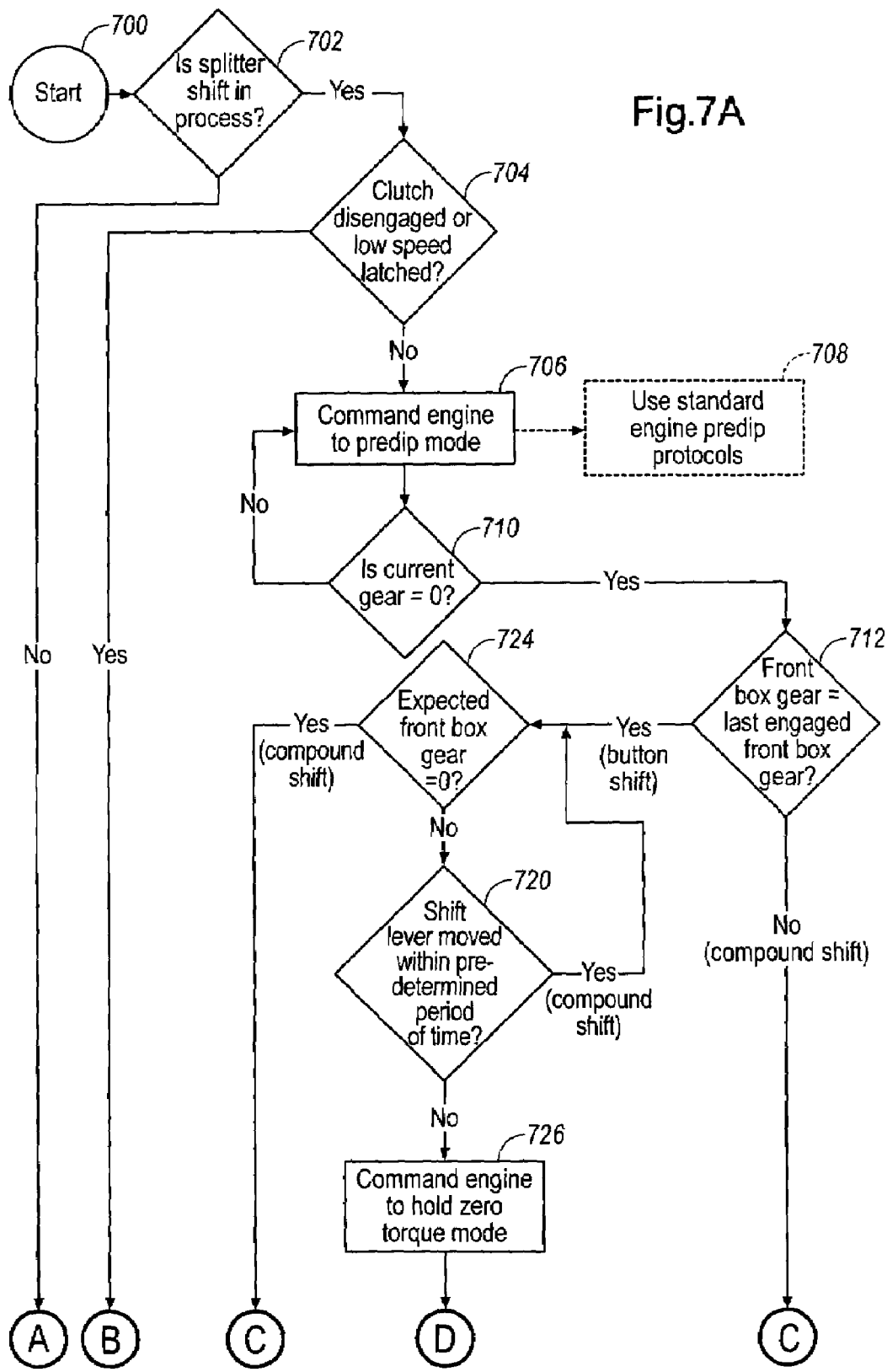

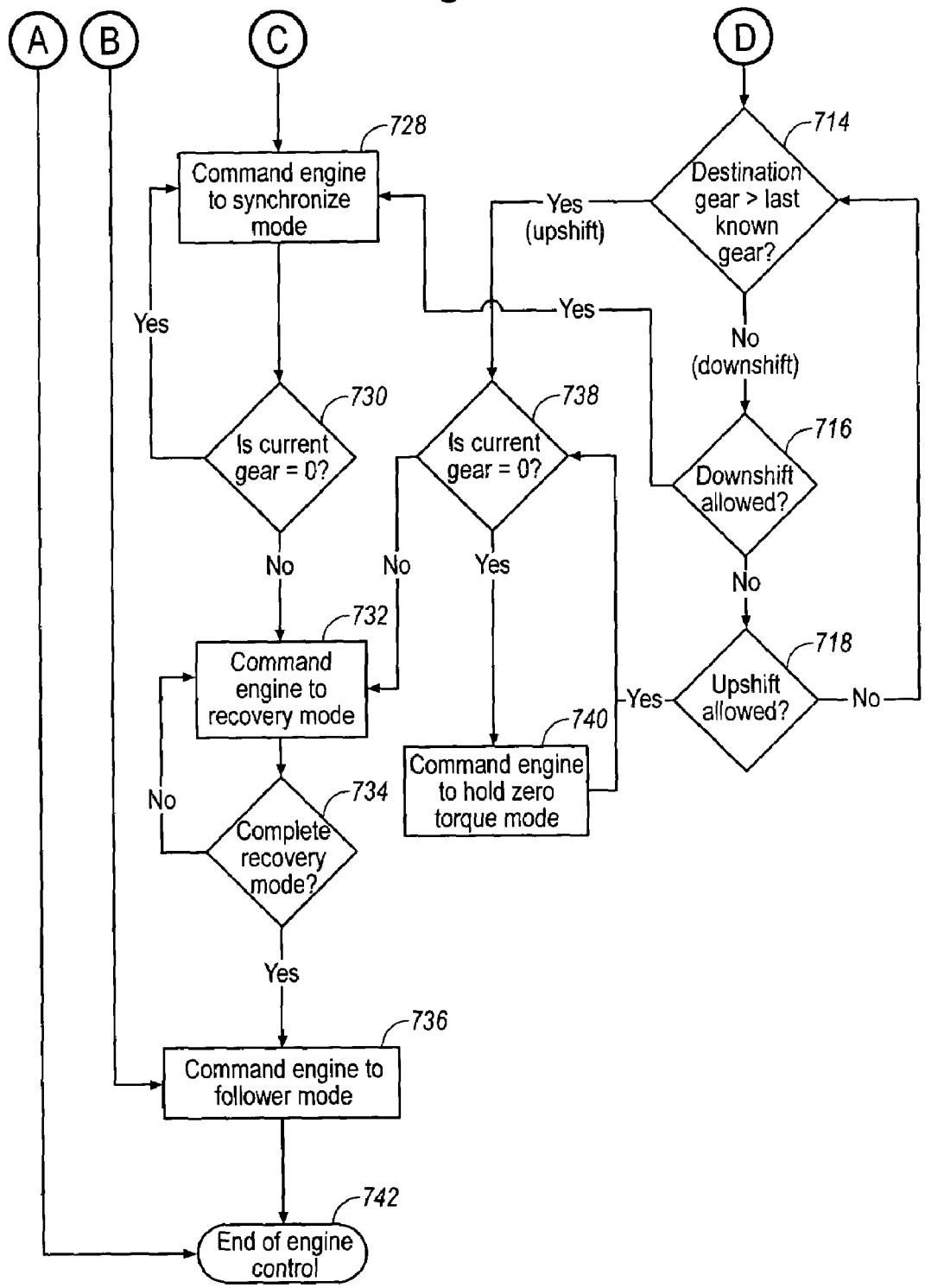

PREDICTION OF DESTINATION GEAR FOR PROGRESSIVE SHIFT FEATURE

BACKGROUND OF THE INVENTION

1. Field of the Invention

The present invention relates to an automatic splitter shifting in a manually shifted compound transmission having a lever-shifted main section connected in series with an auxiliary splitter or splitter-and-range section. In particular, the present invention relates to a prediction of a single, unique destination gear that is combined with splitter and range actuation logic rules, which enables engine and transmission control throughout the entire shift event. Thus, the operator may perform shifts without manipulating the clutch or throttle pedal, including a splitter button initiated compound shift.

2. Description of the Related Art

Controller-assisted, manually shifted transmission systems are known in the prior art, as may be seen by reference to U.S. Pat. Nos. 5,582,558; 5,755,639; 5,766,111; 5,791,189; 5,974,906; 5,989,155 and 6,015,366, the disclosures of which are incorporated herein by reference.

Compound transmissions having a range and/or combined range-and splitter-type auxiliary transmission section are well known in the prior art, as may be seen by reference to U.S. Pat. Nos. 4,754,665 and 5,390,561, the disclosures of which are incorporated herein by reference.

Transmissions having manually shifted main sections and automatically shifted splitter sections are known in the prior art, as may be seen by reference to U.S. Pat. Nos. 5,435,212; 5,938,711; 6,007,455 and 6,044,721, the disclosures of which are incorporated herein by reference.

Compound transmissions having automatically implemented range shifting are well known in the prior art, as may be seen by reference to U.S. Pat. Nos. 5,911,787 and 5,974,906, the disclosures of which are incorporated herein by reference.

To allow additional automation of the shift event, logic is required to determine destination gear and manage the actuation of the transmissions' auxiliary shift actuators (the range and the splitter), as well as the engine when the front box is in neutral (front box gear is equal to zero). Once shift event logic is in place, a transmission shift can be initiated based solely on the change in state of the splitter button and completed without the operator having to manipulate the clutch or throttle pedal. Combining the shift event logic with the already existing progressive shift logic adds additional robustness to the decision to initiate an upshift. In addition, combining shift event logic with throttle pedal input that communicates an idle position contributes additional robustness to the decision to initiate a downshift.

SUMMARY OF THE INVENTION

In accordance with the present invention, a manually shifted compound transmission with a splitter or combined splitter-and-range auxiliary section is provided, which will automatically shift the splitter section and/or automatically disengage and then reengage the splitter section as long as the lever position does not change. Logic rules are provided to determine when the splitter should be reengaged after the splitter is shifted to neutral.

The foregoing is accomplished in a manually shifted compound transmission having a lever-shifted main section connected in series with a splitter or combined splitter-and-range auxiliary section having an actuator for automatically implementing controller-initiated splitter shifts by sensing vehicle operating conditions.

Accordingly, one aspect of the present invention is to provide a method for predicting a destination gear in a controller-assisted, manually shifted vehicular transmission system. The method comprises the steps of:
  determining an expected front box gear; and
  determining whether an intended shift is a compound shift, and if so, a destination gear is predicted based on a shift shaft or shift lever lateral position, a shift lever fore-aft position, and a splitter switch position.

Yet another aspect of the present invention is to provide a new and improved splitter shift control for manually shifted compound transmissions having a splitter shifter for automatically implementing splitter shifts, wherein the controller includes logic rules for:
  determining an expected front box gear; and
  determining whether an intended shift is a compound shift, and if so, a destination gear is predicted based on a shift lever lateral position, a shift lever fore-aft position, and a splitter switch position.

These and other aspects of the present invention will become apparent from a reading of the following description of the preferred embodiment taken in connection with the attached drawings.

BRIEF DESCRIPTION OF THE DRAWINGS

In the drawings:

FIGS. 7A and 7B are schematic illustrations, in flow chart format, of controlling the engine according to another aspect of the present invention.

DESCRIPTION OF THE PREFERRED EMBODIMENT

Figure 1:
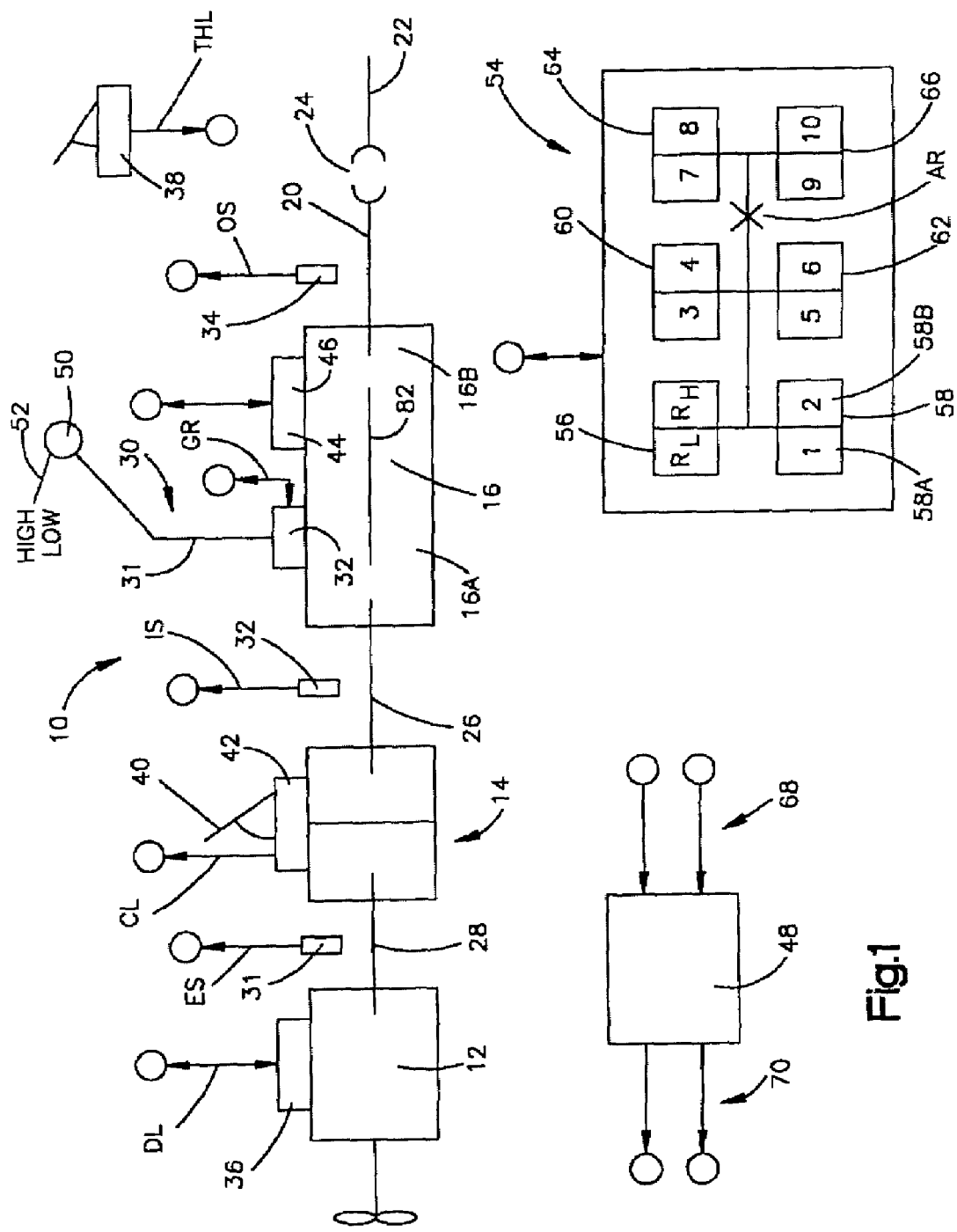
FIG. 1 is a schematic illustration of an ECU-assisted compound mechanical transmission system advantageously utilizing the range shifting control of the present invention.

A computer-assisted (i.e., microprocessor-based, controller-assisted) vehicular compound mechanical transmission system 10, particularly well suited to utilize the range shift control of the present invention, may be seen by reference to FIGS. 1–5B.

System 10 is of the type commonly utilized in heavy-duty vehicles, such as the conventional tractors of tractor/semi-trailer vehicles, and includes an engine, typically a diesel engine 12, a master friction clutch 14 contained within a clutch housing, a multiple-speed compound transmission 16, and a drive axle assembly (not shown). The transmission 16 includes an output shaft 20 drivingly coupled to a vehicle drive shaft 22 by a universal joint 24 for driving the drive axle assembly. The transmission 16 is housed within a transmission housing to which is directly mounted the shift tower of the shift lever assembly 30. The present system is equally applicable to remotely mounted shift levers, as are used in cab-over-engine types of vehicles.

Figure 2:
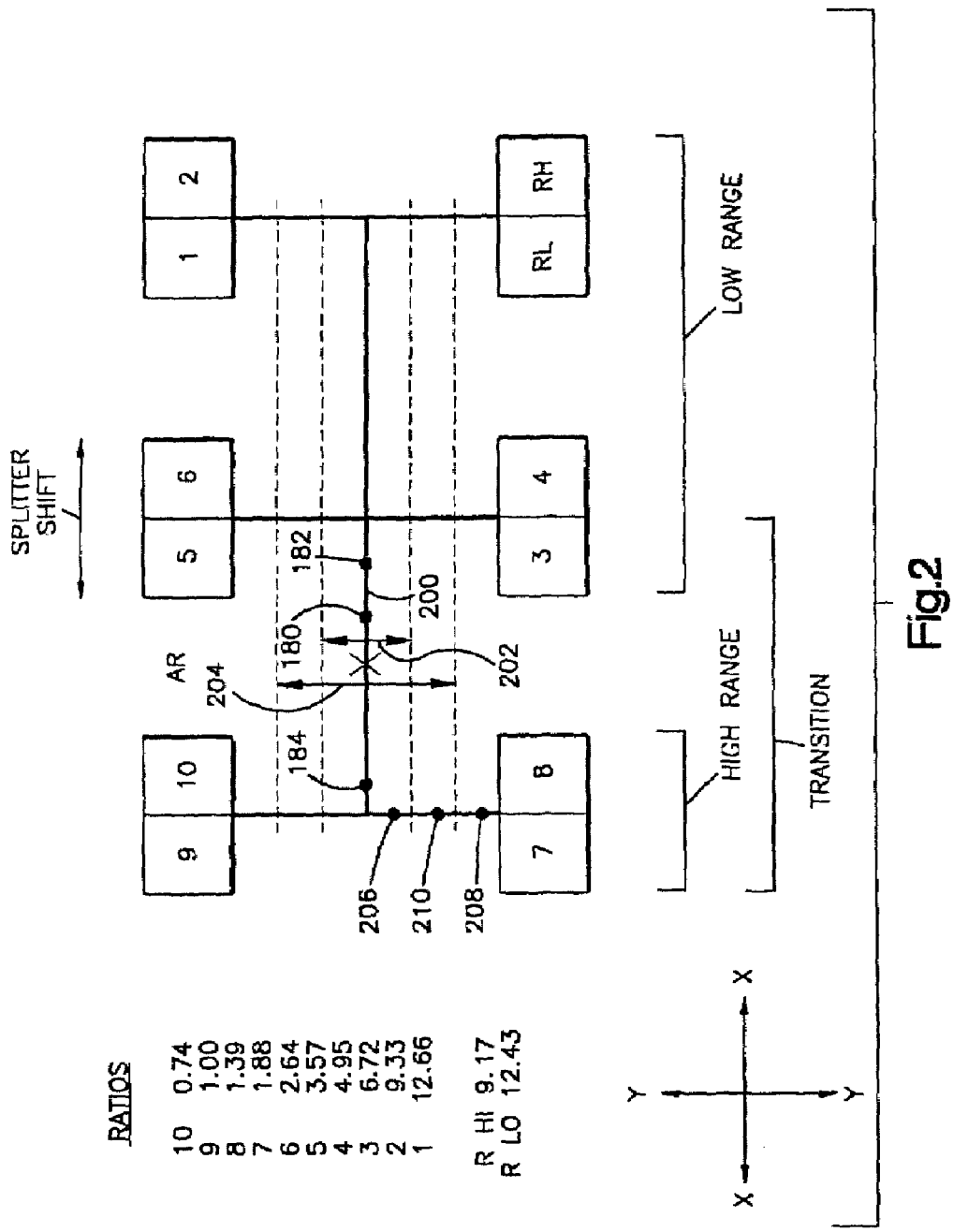
FIG. 2 is a chart illustrating the translation and rotation of a shift shaft to achieve the shift pattern and representative numerical ratios for the transmission of FIG. 1.

FIG. 2 illustrates a shift pattern for assisted manual shifting of a combined range-and-splitter-type compound transmission shifted by a manually operated shift lever. Briefly, the shift lever 31 is movable in the side-to-side or X—X direction to select a particular ratio or ratios to be engaged and is movable in the fore and aft or Y—Y direction to selectively engage and disengage the various ratios. The shift pattern includes an automatic range shifting feature and automatically selected and/or implemented splitter shifting, as is known in the prior art. Manual transmissions utilizing shift mechanisms and shift patterns of this type are well known in the prior art and may be appreciated in greater detail by reference to aforementioned U.S. Pat. Nos. 5,000,060 and 5,390,561.

The shift pattern of FIG. 2 differs from the shift pattern of FIG. 1. FIG. 1 reflects the relative positions of the operator displaced shift knob 50 at the end of the shift lever 31. FIG. 2 reflects the relative positions of a shift finger (not shown) or the like at an end of lever 31 and disposed within mechanism 32. The shift finger extends downwardly into a shifting mechanism 32, such as a multiple-rail shift bar housing assembly or a single shift shaft assembly, as is well known in the prior art and as is illustrated in aforementioned U.S. Pat. Nos. 4,455,883; 4,550,627; 4,920,815 and 5,272,931. It is to be appreciated that it is the shift pattern of FIG. 1 which will be apparent to the vehicle operator, and that the features of the shift pattern of FIG. 2 are also present in the shift pattern of FIG. 1. As described below, it is the displacement of shift shaft 162 which is monitored, and that displacement is imputed to lever 31. The two shift patterns are presented in part to help clarify the appropriate directions of motion being referred to in the description, depending on whether lever displacement or shift finger and associated shift shaft displacement is being described.

In the automatic range shifting feature, as the shift lever moves in the transition area between the middle leg (3/4–5/6) and the right hand leg (7/8–9/10) of the shift pattern, it will cross a point, AR, which will actuate a mechanical or electrical range switch, or will be sensed by a position sensor, to cause automatic implementation of a range shift.

The present invention also is applicable to transmission systems of the type utilizing range shift selector switches which are manually operated independent of shift lever position, as illustrated in aforementioned U.S. Pat. No. 5,222,404.

Shifting of transmission 16, comprising main section 16A coupled in series to auxiliary section 16B, is semi-automatically implemented/assisted by the vehicular transmission system 10, illustrated in FIGS. 1–5B. Main section 16A includes an input shaft 26, which is operatively coupled to the drive or crank shaft 28 of the vehicle engine 12 by master clutch 14, and output shaft 20 of auxiliary section 16B is operatively coupled, commonly by means of a drive shaft 24, to the drive wheels of the vehicle. The auxiliary section 16B is a combined range-and-splitter type, as illustrated in U.S. Pat. Nos. 4,754,665 and 5,390,561.

The change-gear ratios available from main transmission section 16 are manually selectable by manually positioning the shift lever 31 according to the shift pattern prescribed to engage the particular desired change gear ratio of main section 16A.

The system includes sensors 30 (for sensing engine rotational speed (ES)), 32 (for sensing input shaft rotational speed (IS)), and 34 (for sensing output shaft rotational speed (OS)), and providing signals indicative thereof. As is known, with the clutch 14 engaged (i.e., no slip) and the transmission engaged in a known gear ratio, ES=IS=OS*GR (see U.S. Pat. No. 4,361,060). Accordingly, if clutch 14 is engaged, engine speed and input shaft speed may be considered as equal. Input shaft speed sensor 32 may be eliminated and engine speed (ES), as sensed by a sensor or over a data link (DL), substituted therefor.

Engine 12 is electronically controlled, including an engine electronic controller, alternatively known as an engine electronic control unit, or an engine ECU 36 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor 38 may be provided or throttle position (THL) may be sensed from the data link. Gross engine torque ($T_{EG}$) and base engine friction torque ($T_{BEF}$) also are available on the data link.

A manual clutch pedal 40 controls the master clutch 14, and a sensor 42 provides a signal (CL) indicative of clutch-engaged or -disengaged condition. The condition of the clutch also may be determined by comparing engine speed to input shaft speed if both signals are available. An auxiliary section actuator 44 including a range shift actuator and a splitter actuator 46 is provided for operating the range clutch and the splitter section clutch in accordance with command output signals from a transmission controller or ECU 48. The shift lever 31 has a knob 50 which contains splitter selector switch 52 by which a driver's intent to initiate a splitter shift may be sensed.

Transmission ECU 48 is preferably a microprocessor-based control unit of the type illustrated in U.S. Pat. Nos. 4,595,986; 4,361,065 and 5,335,566, the disclosures of which are incorporated herein by reference, for receiving input signals 68 and processing same according to predetermined logic rules to issue command output signals 70 to system actuators, such as the splitter section actuator 46, the engine ECU 36, the range shift actuator and/or a display unit 54. A separate system controller may be utilized, or the engine ECU 36 communicating over an electronic data link may be utilized. A single integrated ECU might also be employed.

System 10 may include a driver's display unit 54 including a graphic representation of the six-position shift pattern with individually lightable display elements 56, 58, 60, 62, 64 and 66, representing each of the selectable engagement positions. Preferably, each half of the shift pattern display elements (for example, 58A and 58B) will be individually lightable, allowing the display to inform the driver of the lever and splitter position for the engaged ratio.

As shown in U.S. Pat. Nos. 5,651,292 and 5,661,998 (the disclosures of which are incorporated herein by reference), the splitter actuator 46 is, preferably, a three-position device, allowing a selectable and maintainable splitter section neutral. Alternatively, a "pseudo" splitter-neutral may be provided by deenergizing the splitter actuator when the splitter clutch is in an intermediate, non-engaged position.

Figure 3:
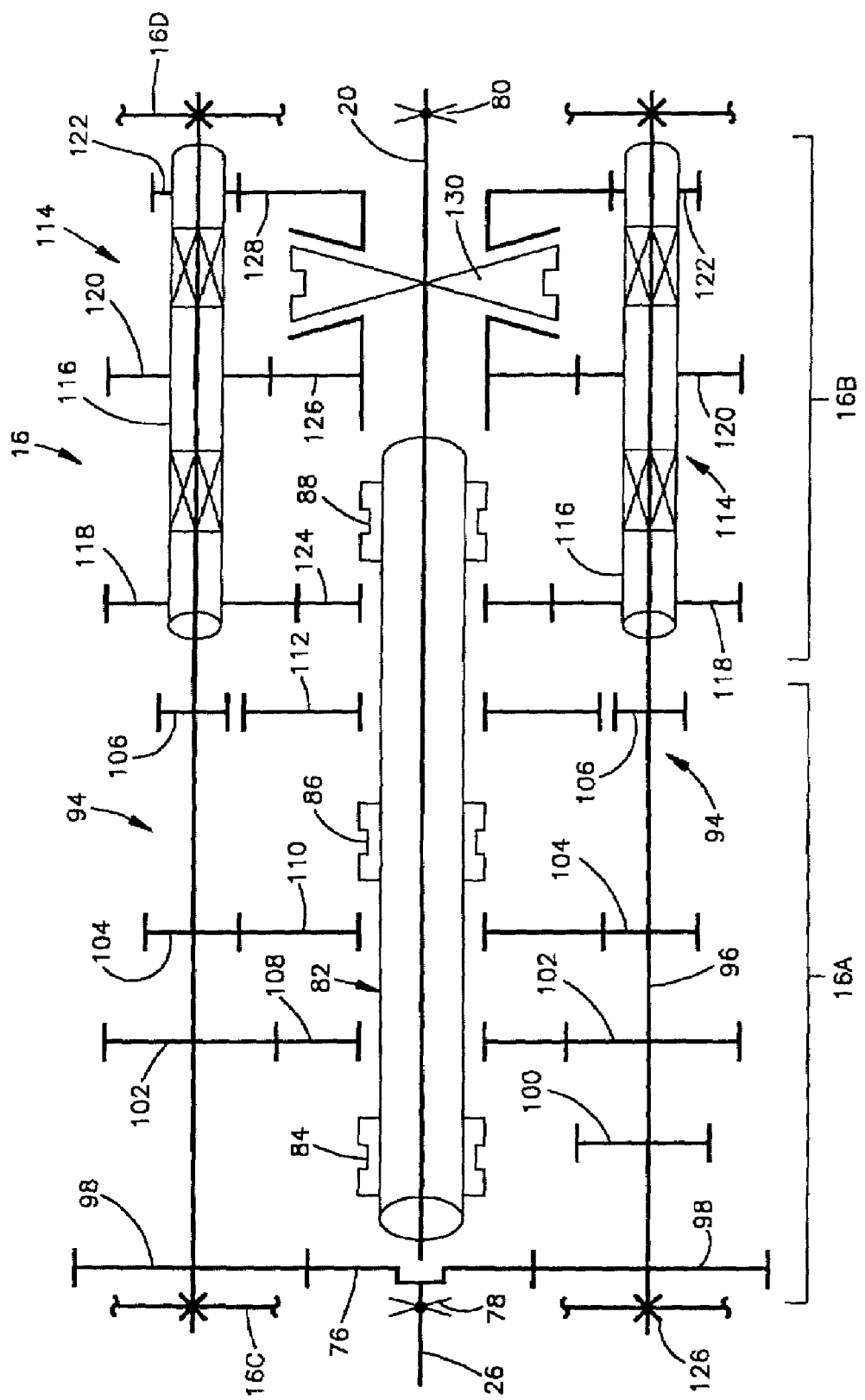
FIG. 3 is a schematic illustration of the structure of the compound mechanical transmission of FIG. 1.

The structure of the 10-forward-speed combined range-and-splitter-type transmission 16 is schematically illustrated in FIG. 3. Transmissions of this general type are disclosed in aforementioned U.S. Pat. Nos. 5,000,060; 5,370,013 and 5,390,561.

Transmission 16 includes a main section 16A and an auxiliary section 16B, both contained within a housing including a forward end wall 16C, which may be defined by the clutch housing, and a rearward end wall 16D. In this particular embodiment an intermediate wall separating main section 16A and auxiliary section 16B is not employed, but one could be without effect on the present invention.

Input shaft 26 carries input gear 76 fixed for rotation therewith and defines a rearwardly opening pocket wherein a reduced diameter extension of output shaft 20 is piloted. A non-friction bushing or the like may be provided in the pocket or blind bore. The rearward end of input shaft 26 is supported by bearing 78 in front end wall 16C, while the rearward end of output shaft 20 is supported by bearing assembly 80 in rear end wall 16D.

The mainshaft 82, which carries mainshaft clutches 84 and 86, and the mainshaft splitter clutch 88 is in the form of a generally tubular body having an externally splined outer surface and an axially extending through bore for passage of output shaft 20. Shift forks 90 and 92 are provided for shifting clutches 86 and 84, respectively (see FIG. 5A). Mainshaft 82 is independently rotatable relative to input shaft 26 and output shaft 20 and preferably is free for limited radial movement relative thereto.

The main section 16A includes two substantially identical main section countershaft assemblies 94, each comprising a main section countershaft 96 carrying countershaft gear pairs 98, 102, 104 and 106 fixed thereto. Gear pairs 98, 102, 104 and 106 are constantly meshed with input gear 76, mainshaft gears 108 and 110 and an idler gear (not shown), which is meshed with reverse mainshaft gear 112, respectively. One of the countershaft assemblies 94 may include a gear 100, commonly known as a power take-off gear.

Main section countershaft 96 extends rearwardly into the auxiliary section, where its rearward end is supported directly or indirectly in rear housing end wall 16D.

The auxiliary section 16B of transmission 16 includes two substantially identical auxiliary countershaft assemblies 114, each including an auxiliary countershaft 116 carrying auxiliary countershaft gears 118, 120 and 122 for rotation therewith. Auxiliary countershaft gear pairs 118, 120 and 122 are constantly meshed with splitter gear 124, splitter/range gear 126 and range gear 128, respectively. Splitter clutch 88 is fixed to mainshaft 82 for selectively clutching either gear 124 or 126 thereto, while synchronized range clutch 130 is fixed to output shaft 20 for selectively clutching either gear 126 or gear 128 thereto.

Auxiliary countershafts 116 are generally tubular in shape, defining a through bore for receipt of the rearward extensions of the main section countershafts 96. Bearings or bushings are provided to rotatably support auxiliary countershaft 116 on main section countershaft 96.

The splitter jaw clutch 88 is a double-sided, non-synchronized clutch assembly which may be selectively positioned in the rightwardmost or leftwardmost positions for engaging either gear 126 or gear 124, respectively, to the mainshaft 82 or to an intermediate position wherein neither gear 124 or 126 is clutched to the main shaft. Splitter jaw clutch 88 is axially positioned by means of a shift fork 98 controlled by a three-position actuator, such as a piston actuator, which is responsive to a driver selection switch such as a button or the like on the shift knob, as is known in the prior art and to control signals from ECU 48 (see U.S. Pat. No. 5,661,998).

Two-position synchronized range clutch assembly 130 is a two-position clutch which may be selectively positioned in either the rightwardmost or leftwardmost positions thereof for selectively clutching either gear 128 or 126, respectively, to output shaft 20. Clutch assembly 130 is positioned by means of a shift fork (not shown) operated by means of a two-position piston device. Either of the range and splitter piston actuators may be replaced by a functionally equivalent actuator, such as a ball screw mechanism, ball ramp mechanism or the like.

By selectively axially positioning both the splitter clutch 88 and the range clutch 130 in the forward and rearward axial positions thereof, four distinct ratios of mainshaft rotation to output shaft rotation may be provided. Accordingly, auxiliary transmission section 16B is a three-layer auxiliary section of the combined range and splitter type providing four selectable speeds or drive ratios between the input (mainshaft 82) and output (output shaft 20) thereof. The main section 16A provides a reverse and three potentially selectable forward speeds. However, one of the selectable main section forward gear ratios, the low-speed gear ratios associated with mainshaft gear 110, is not utilized in the high range. Thus, transmission 16 is properly designated as a "(2+1)×(2×2)" type transmission providing nine or ten selectable forward speeds, depending upon the desirability and practicality of splitting the low gear ratio.

Splitter shifting of transmission 16 is accomplished responsive to initiation by a vehicle operator-actuated splitter button 52 or the like, usually a button located at the shift lever knob, while operation of the range clutch shifting assembly is an automatic response to movement of the gear shift lever between the central and rightwardmost legs of the shift pattern, as illustrated in FIG. 2. Alternatively, splitter shifting may be automated (see U.S. Pat. No. 5,435,212). Range shift devices of this general type are known in the prior art and may be seen by reference to aforementioned U.S. Pat. Nos. 3,429,202; 4,455,883; 4,561,325 and 4,663,725. Alternatively, a driver operator switch could be employed to initiate range shifting. Such shifting may only be initiated with the main section 16A in neutral.

Although the present invention is illustrated in the embodiment of a compound transmission not having an intermediate wall, the present invention is equally applicable to transmissions of the type illustrated in aforementioned U.S. Pat. Nos. 4,754,665; 5,193,410 and 5,368,145.

According to the present invention, and as more fully described in aforementioned U.S. Pat. No. 5,651,292, the interengaging clutch teeth provided on splitter clutch 88 and on splitter gear 124 and splitter/range gear 126 are of a relatively large backlash (i.e., about 0.020–0.060 inches for a 3.6-inch pitch diameter clutch), which will assure that almost any attempted splitter shift under full force will be completed.

Figure 4:
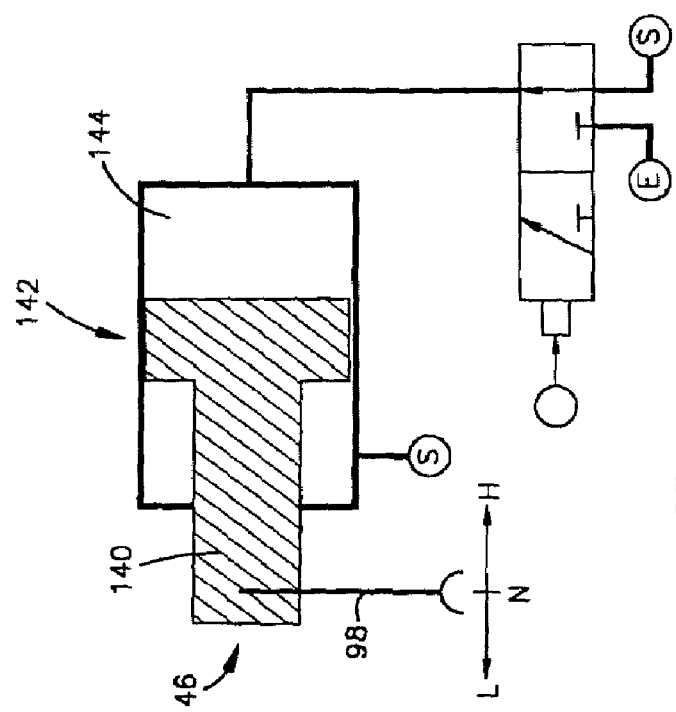
FIG. 4 is a schematic illustration of a three-position splitter actuator for use with the transmission system of FIG. 1.

The clutch 88 is moved by a shift fork 98 attached to the piston rod 140 of the piston actuator assembly 142 (see FIG. 4). Actuator assembly 142 may be a conventional three-position actuator (see U.S. Pat. No. 5,054,591, the disclosure of which is incorporated herein by reference) or an actuator of the type illustrated in U.S. Pat. No. 5,682,790 or 5,661,998 (the disclosures of which are incorporated herein by reference), wherein pulse width modulation of a selectively pressurized and exhausted chamber 144 may be used to achieve the three splitter positions (L, N, H) of the shift fork.

Preferably, the splitter clutch actuator 142 will be capable of applying a variable force, such as by pulse width modulation, of supply pressure. A force lesser than full force may be utilized when disengaging and/or when synchronous conditions cannot be verified.

The controller 48 is provided with logic rules under which, if the main section is engaged, a shift from splitter neutral into a selected target splitter ratio is initiated such that, under normal conditions, including proper operator fuel control, the synchronous error (which is equal to input shaft rotational speed minus the product of output shaft rotational speed and transmission target gear ratio) is expected to be equal to or less than a value selected to give smooth, high-quality shifts ((IS− (OS*GR))=ERROR≦REF). The timing is done in regard to sensed/expected shaft speeds, shaft acceleration/deceleration and actuator reaction times.

In certain situations, the logic rules will recognize operating conditions wherein the preferred synchronous window (i.e., IS=(OS*GR)±60 RPM) must be expanded to accomplish a splitter shift, even at the expense of shift quality. These situations, usually associated with up-shifts, include if shifting attempted at low engine speeds wherein expected engine speed at shift completion will be undesirably low, if deceleration of the output shaft is relatively high (dOS/dt<REF), if the deceleration of the engine is relatively low (dES/dt>REF) and/or if the absolute value of the synchronous error is not approaching the normal value at an acceptable rate.

The position of the shift lever 31 or of the shifting mechanism 32 controlled thereby is sensed by a position sensor device. Various positioning sensing assemblies are known in the prior art, with a preferred type illustrated in U.S. Pat. No. 5,743,143, assigned to the assignee of this application, the disclosure of which is incorporated herein by reference.

Figure 5B:
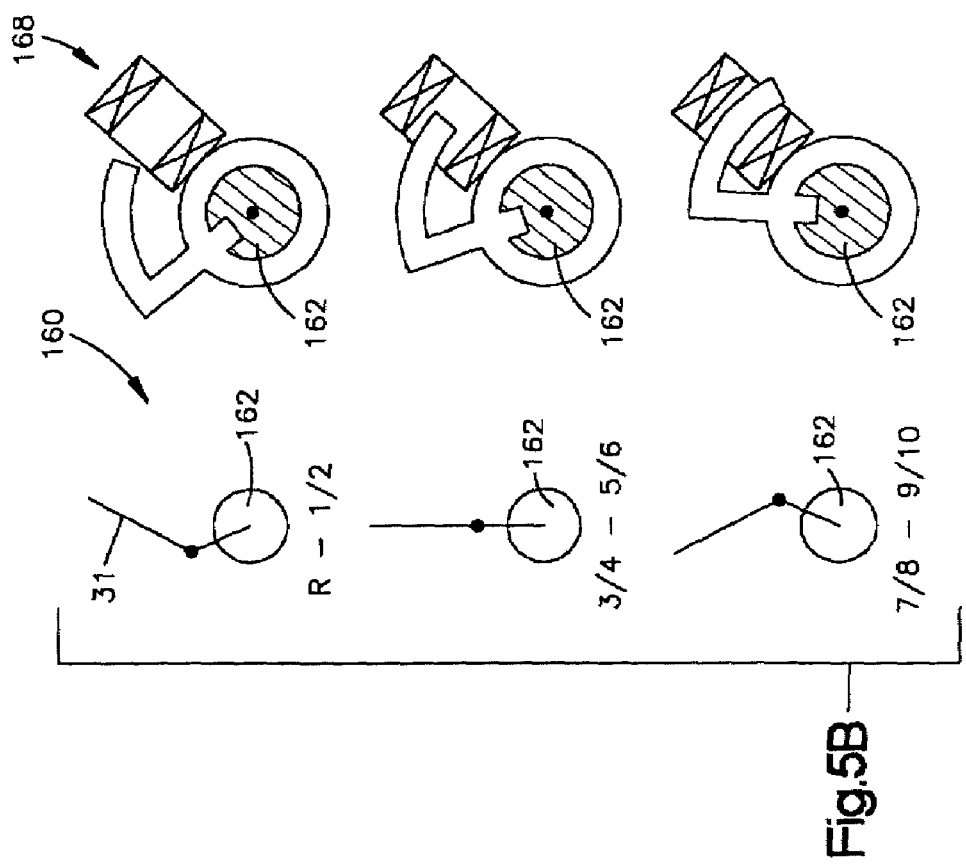
FIGS. 5A and 5B are schematic illustrations of a shift shaft position sensor mechanism for use in the system of FIG. 1.
Figure 5A:
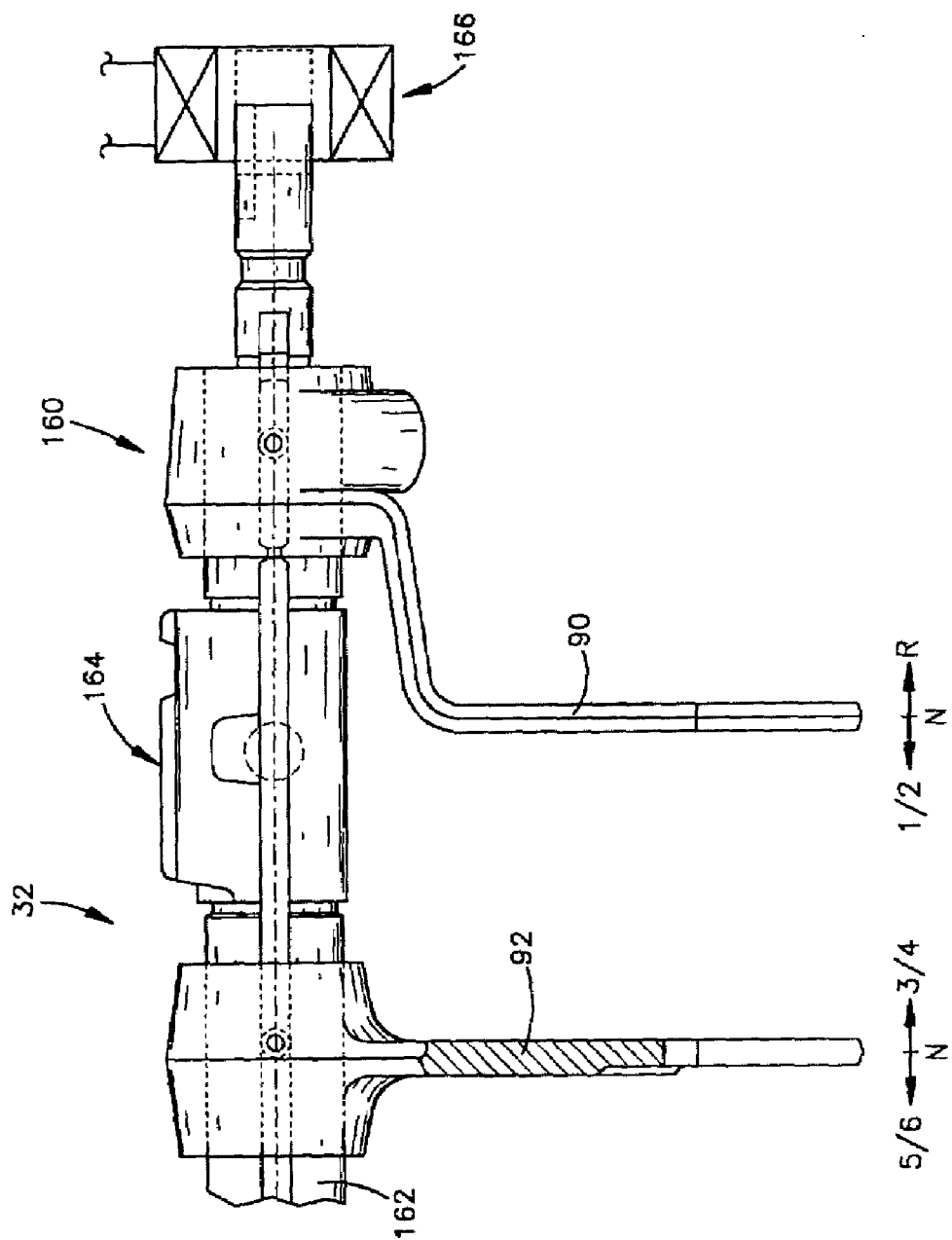

Referring to FIGS. 5A and 5B, shifting mechanism 32 is illustrated as a single shift shaft device 160 having a shift shaft 162 which is rotatable in response to X—X movements of shift lever 31 and axially movable in response to Y—Y movements of shift lever 31. Mechanisms of this type are described in detail in aforementioned U.S. Pat. No. 4,920,815. It should be appreciated that the function of displacing shift forks 90 and 92 could alternatively be provided by a mechanism employing a plurality of shift rails like that shown in U.S. Pat. No. 4,455,883. The rotative or angular positions of shaft 162 are analogous to separate rails in that both correspond to movement of the shift lever in the X—X direction.

Shift shaft 162 carries the main section shift forks 90 and 92 for selective axial movement therewith and a shift block member 164 for receiving a shift finger or the like. A pair of coils 166 and 168 provides a pair of signals (collectively GR) indicative of the axial and rotational position of shaft 162 and, thus, of shift lever 31 relative to the shift pattern illustrated in FIG. 2. Preferably, the rate of change of position (dGR/dt) also may be determined and utilized to enhance shifting of the system 10.

By way of example, referring to FIG. 2, if shift lever position can be sensed, the need for a fixed switch or the like at point AR to sense a required initiation of a shift between low range and high range is eliminated. Further, as physical switches are no longer required, the shift pattern position at which a range shift will be commanded can be varied, such as to points 180, 182 or 184, to enhance system performance under various operating conditions. It should be appreciated that, for the purposes of the presentation, a position indicator switch or switches may be employed in place of position sensor devices.

If in first (1st) through fourth (4th), a shift into high range is considered unlikely, and the auto range shift initiation point may be moved to position 184 (away from the expected shift lever path) to prevent inadvertent actuation of a range shift. If in sixth (6th) with a high engine speed, a shift into high range is likely. Accordingly, moving the auto range initiation point to position 180 when in sixth gear will allow for a quicker initiation of a range shift.

Without the use of the present invention, the operator is allowed to control engine fueling unless the current vehicle operating conditions indicate that his/her operation of the throttle pedal will not allow the jaw clutches associated with the current target ratio to engage. If operating conditions, including operator setting of the throttle pedal, indicate that the operator will complete a splitter shift into target ratio, the engine will be fueled in accordance with operator throttle setting. If not, automatic engine fueling may occur. If the splitter section does engage prior to the main section, as is preferred, the operator will remain in complete control of engine fueling to complete the shift by engaging the main section.

The state of engagement (i.e., engaged or neutral) of the main transmission section 16A is an important control parameter for system 10. By way of example, if main section neutral is sensed, the splitter may be commanded to a full force engagement, regardless of the existence or absence of appropriate synchronous conditions. Also, if the main section is engaged while the splitter is in neutral, the system will initiate automatic fuel control until an appropriate substantial synchronous condition is sensed and the splitter is then engaged. Of course, it is important to prevent or minimize false determinations of main section neutral and/or engaged conditions.

Referring to FIG. 2, a first narrow band 202 and a second wider band 204 of vertical displacements from a center position 200 are utilized to determine if the main section is or is not in neutral. If the transmission main section is not confirmed as being in main section neutral, the neutral confirmation band will be the narrower band 202. This will assure that the main section 16A is truly in neutral before declaring a main section neutral condition. If the transmission main section 16A is confirmed as being in neutral, the neutral confirmation band will be the wider band 204. This assures that mere overshooting of neutral or raking of main section jaw clutches will not be incorrectly interpreted as a main section engaged condition.

Sensing the shift lever at point 206 will always be interpreted as main section neutral, and sensing the shift lever at point 208 will always be interpreted as main section engaged. However, if the shift lever is sensed at point 210, this will not cause a previous determination of a neutral or engaged condition to change. Alternate means of sensing neutral, such as position switches, may be employed for the purposes of the present invention. However, it should be appreciated that position sensors beneficially are capable of providing information which enable more precise control of shifting.

Vehicle operating conditions other than or in addition to currently engaged or neutral condition of the main section 16A may be used to vary the width of the neutral sensing bands.

In operation, system 10 will sense an operator's intent to perform a lever shift, which comprises shifting from a currently engaged ratio into neutral, and then shifting from neutral into a target ratio. A "lever shift" involves a change in main section ratio and is accomplished by moving the shift lever from one shift pattern position to a different shift pattern position. A splitter-only shift (such as 5th to 6th) does not require use of the shift lever 31 and is accomplished automatically or in response to the operation of a splitter ratio selector switch 50. A compound shift is a combination of a lever shift and a splitter shift. A combined lever shift and range shift does not comprise a compound shift in the present application.

In the preferred embodiment, intent to shift is a change of state occurring at the splitter switch 50. Upon sensing such intent, the system will respond by commanding the splitter actuator 46 to bias the splitter toward the neutral position thereof and will assume automatic control of engine fueling to cause driveline torque to assume a minimal value, thereby minimizing torque lock and allowing the engaged jaw clutches to easily separate.

Upon sensing either main section or auxiliary section neutral, the controller 48 will cease commanding the engine to dither about a zero torque value and will preferably command the engine to idle speed or toward a synchronous speed for engaging an assumed destination gear ratio. Upon sensing main section neutral, usually sensed by the shift lever being in the neutral band 202 in the Y—Y direction, the controller will command the splitter actuator to assume an automatically or manually selected splitter ratio. The splitter ratio may be selected by use of a splitter button or switch 50, commonly located on the shift knob, or may be automatically selected (see U.S. Pat. No. 5,435,212, the disclosure of which is incorporated herein by reference). At this time, the system will determine the identity of the true destination gear on the basis of the X–Y position sensor, which will indicate if the shift lever is aligned in the "R and 1st/2nd" leg or "3rd/4th and 5th/6th" leg or the "7th/8th and 9th/10th" leg of the shift pattern. If a compound shift (and not automatically selected), then the splitter button position is also used to determine target gear ratio.

By way of example, if the shift lever is aligned with the 7th/8th and 9th/10th leg of the shift pattern, a displacement of shift shaft 162 in the aft direction will indicate that seventh or eighth gear is the target gear, and a displacement in the fore direction will indicate that ninth or tenth is the target gear. Upon identifying the target gear ratio, the controller will cause the engine to assume a substantially synchronous rotation for engaging the target ratio based upon existing vehicle operating conditions. Typically, this substantially synchronous speed is the product of output shaft speed multiplied by the numerical ratio of the target gear ratio. Of course, as is well known in the prior art, an offset may be allowed or built into the calculation of the target synchronous speed. Upon sensing engagement of the destination gear, control of engine fueling is returned to the operator.

Figure 6A:
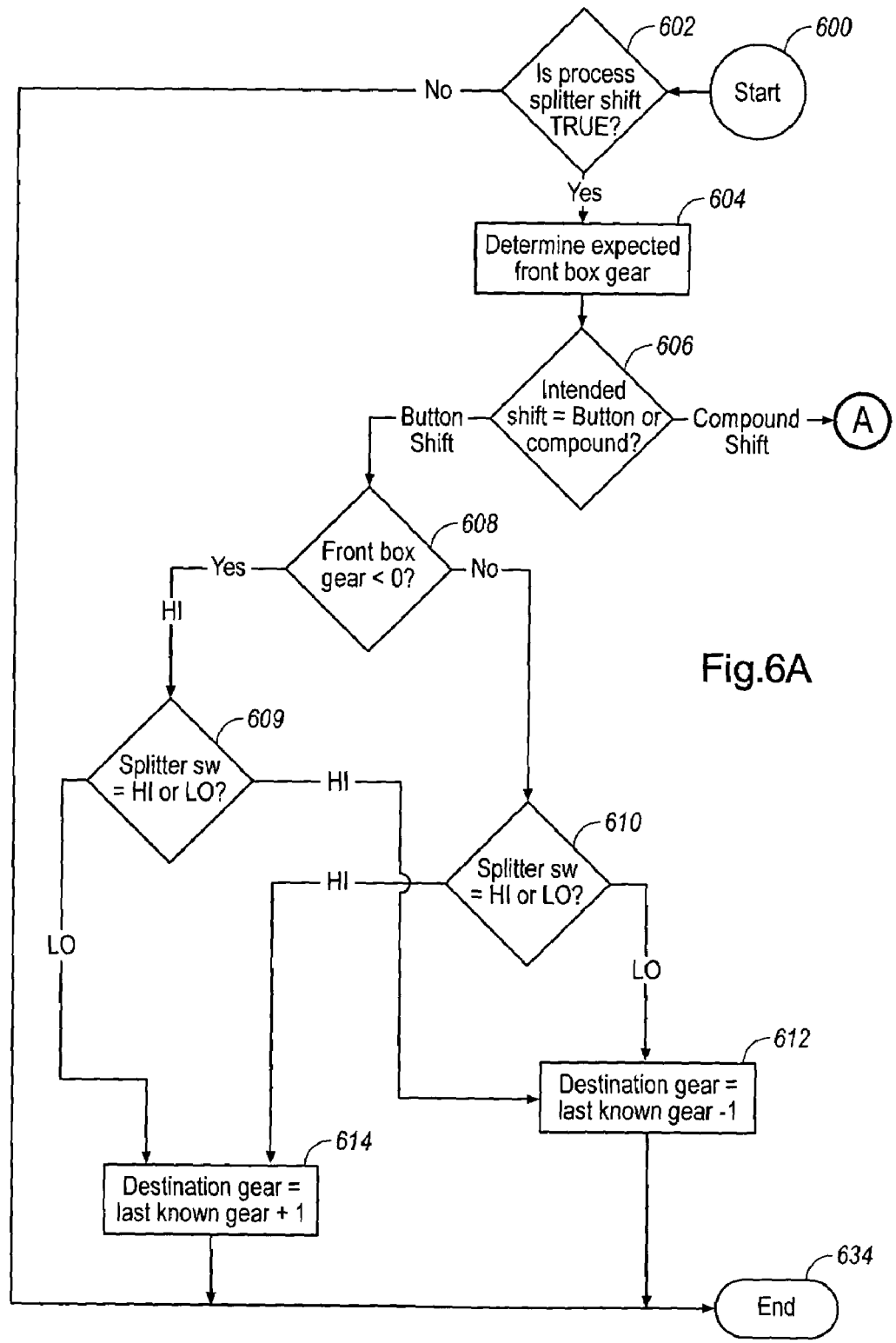
FIGS. 6A and 6B are schematic illustrations, in flow chart format, of predicting a destination gear according to one aspect of the present invention.
Figure 6B:
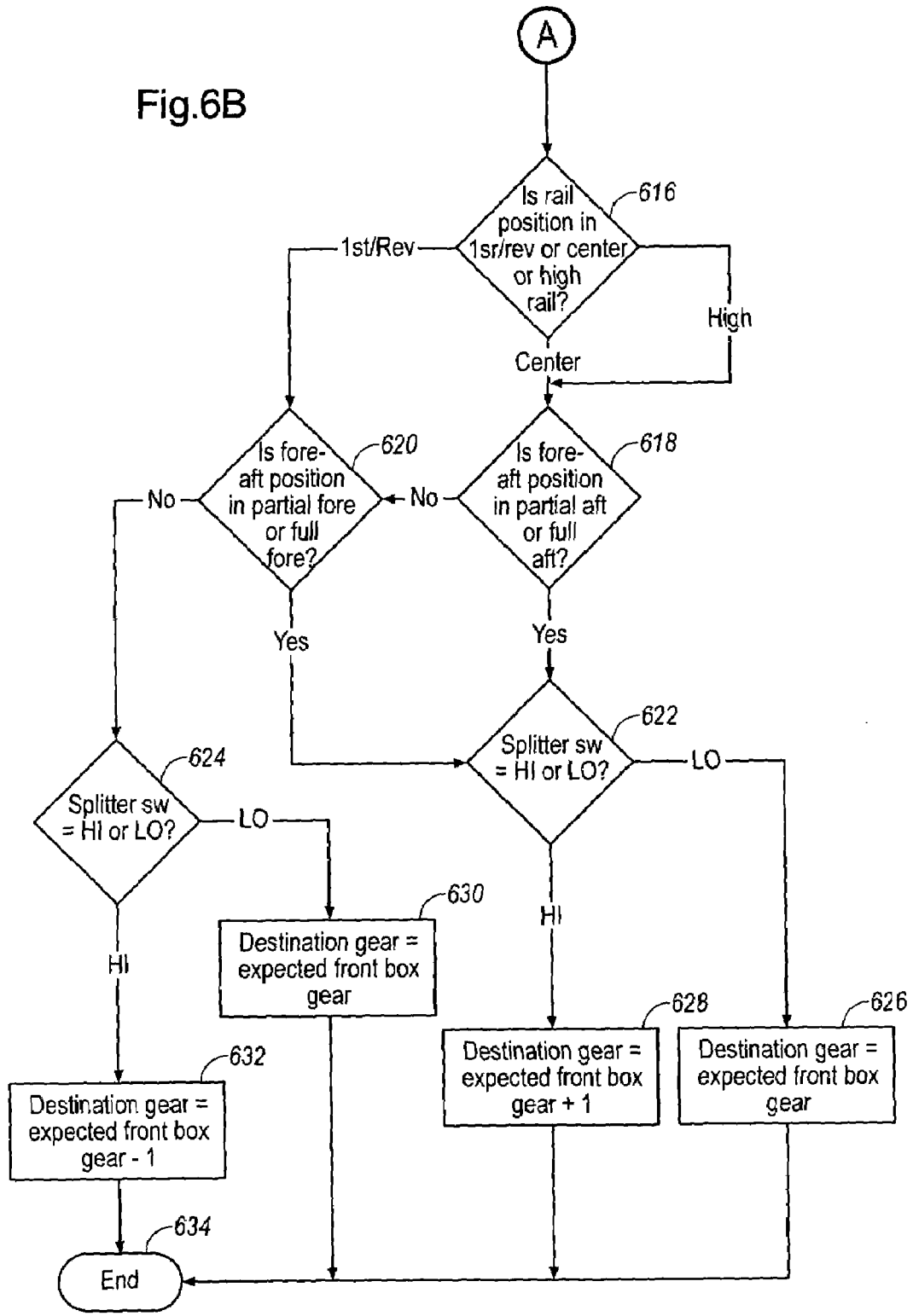

According to one aspect of the invention, as shown in FIGS. 6A and 6B, a protocol of predicting a destination gear in the controller-assisted manually shifted vehicular transmission system 10 is described. The protocol begins at step 600, and at step 602, the ECU 48 determines whether the splitter shift process is TRUE, such as the splitter button position change being initiated by the operator. If not, then a destination gear is not predicted and the protocol ends at step 634. If the splitter shift process is TRUE in step 602, then the protocol proceeds to step 604 to determine an expected front box gear. The term "Shift Lever Lateral Position" as used in the logic rules below means the position of the shift selection mechanism along the Y—Y axis, independent of the type of mechanism employed. For example, the $1^{st}$/Rev position corresponds to the orientation at the bottom of FIG. 5B, the Center position corresponds to the orientation in the middle of FIG. 5B, and the High position corresponds to the orientation at the top of FIG. 5B. It should be appreciated that fork 92 and clutch 84 are displaced for both the Center position shifts and the High position shifts. For the $1^{st}$/Rev and Center position shifts, range clutch assembly 130 engages gear 128. For the High position shifts, range clutch assembly 130 engages gear 126. The term "Shift Lever Fore-Aft Position" as used in the logic rules below means the X—X axis position of the shift selection mechanism. "Fore" corresponds to the uppermost or $1^{st}/2^{nd}$, $5^{th}/6^{th}$, or $9^{th}/10^{th}$ position in FIG. 2, or movement in that direction. "Aft" corresponds to the lowest or RL/RH, $3^{rd}/4^{th}$ or $7^{th}/8^{th}$ position in FIG. 2, or movement in that direction. The expected front box gear is determined by the following logic rules:

1. if (shift lever lateral position=$1^{st}$/Rev)
   AND if (shift lever fore-aft position=Partial Aft or Full Aft)
   THEN expected front box gear=−1
   ELSE if (shift lever fore-aft position=Partial Fore or Full Fore)
   THEN expected front box gear=1
2. else if (shift lever lateral position=Center)
   AND if (shift lever fore-aft position=Partial Aft or Full Aft)
   THEN expected front box gear=3
   ELSE if (shift lever fore-aft position=Partial Fore or Full Fore)
   THEN expected front box gear=5
3. else if (shift lever lateral position=High)
   AND if (shift lever fore-aft position=Partial Aft or Full Aft)
   THEN expected front box gear=7
   ELSE if (shift lever fore-aft position=Partial Fore or Full Fore)
   THEN expected front box gear=9

It should be noted from the above logic rules that the expected front box gear is determined independently of the splitter switch position.

Next, the protocol determines whether the intended shift is a button shift or a compound shift in step 606. The protocol uses several terms which are defined below in determining whether the shift intent is a compound shift or a button only shift. By definition, the "front box gear" identifies the combined front box and range clutch conditions corresponding to the associated shift lever positions. The "front box gear" shift lever positions are limited to −1 (Reverse), 0 (Neutral), 1, 3, 5, 7 or 9, ignoring the splitter condition. The "last engaged front box gear" is used to track the previous or known state of the "front box gear." The "last engaged front box gear" is maintained at a non-zero value (−1, 1, 3, 5, 7 or 9), even when the "front box gear" valve is or has been equal to zero (neutral). The "last engaged front box gear" is reset when the current gear is not equal to zero. A value for a "last known gear" is used to track the known or previous state of a value for a "current gear." The "current gear" is the "front box gear" value adjusted for the splitter value, and therefore can be equal to −2, −1, 0, 1, 2, 3, 4, 5, 6, 7, 8, 9 or 10. The "last known gear" is maintained at a non-zero value, even when the "current gear" is equal to zero (neutral). The "last known gear" only changes when the "current gear" is not equal to zero. Thus, the "current gear" could be equal to zero, even though the "front box gear" is not equal to zero. However, if the "front box gear" is equal to zero, then the "current gear" must be equal to zero. The shift intent is determined by the following logic rules:

1. if (last known gear=odd gear & splitter switch position=HI)
   AND if (front box gear=last engaged front box gear)
   THEN intended shift=Button only shift
   ELSE (intended shift=Compound shift)

According to step 1, for the last known gear to equal an odd gear, the splitter switch must have at some point been equal to LO. For the conditions above to be met, the operator has changed the state of the splitter switch. Because the operator has not moved the shift lever (front box gear=last engaged front box gear), the operator's intent is to complete a button shift. In other words, if (last known gear=odd gear & splitter switch position=HI)
   AND if (front box gear≠last engaged front box gear)
   THEN intended shift=Compound shift 2. else if (last known gear=even gear & splitter switch position=LO)
   AND if (front box gear=last engaged front box gear)
   THEN intended shift=Button only shift
   ELSE (intended shift=Compound shift)

According to step 2, for the last known gear to equal an even gear, the splitter switch must have at some point been equal to HI. For the conditions above to be met, the operator has changed the state of the splitter switch. Because the operator has not moved the shift lever (front box gear=last engaged front box gear), the operator's intent is to complete a button shift. In other words, if (last known gear=even gear & splitter switch position=LO)
   AND if (front box gear≠last engaged front box gear)
   THEN intended shift=Compound shift 3. else intended shift=Compound shift If the intended shift is determined to be a button shift in step 606, then the protocol proceeds to step 608 and a determination is made whether the front box gear is less than zero, i.e. reverse. If the front box gear is less than zero, then the protocol proceeds to step 609 and a determination is made whether the splitter switch is in the High or Low position. If the splitter switch is in the High position, then the protocol proceeds to step 612 and determines that the destination gear is equal to the last known gear minus one. For example, if the last known gear ratio was $4^{th}$ gear, then the destination gear or destination gear ratio is determined to be $3^{rd}$ gear. On the other hand, if the splitter switch is in the Low position, then the protocol proceeds to step 614 and determines that the destination gear is equal to the last known gear plus one.

If in step 608 a determination was made that the front box gear is not less than zero, then the protocol proceeds to step 610 and a determination is made whether the splitter switch is in the High or Low position. If the splitter switch is in the High position, then the protocol proceeds to step 614 and determines that the destination gear is equal to the last known gear plus one. On the other hand, if the splitter switch is in the Low position, then the protocol proceeds to step 612 and determines that the destination gear is equal to the last known gear minus one. After determining the destination gear in either steps 612 and 614, the protocol ends at step 634.

If in step 606, the determination is made that the intended shift is a compound shift by the operator moving the shift lever, then the protocol proceeds to step 616 (FIG. 6B) and determines whether the shift lever lateral position is the $1^{st}$/Reverse, Center or High position. If in either the Center or High positions, the protocol proceeds to step 618 and a determination is made whether the shift lever fore-aft position is in the partial aft position or the full aft position. The shift lever fore-aft position is in the partial aft position when the shift lever is positioned between the aft portion of the band between points 210 and 208, and in the full aft position when the shift lever is positioned beyond point 208. If so, then the protocol proceeds to step 622 and a determination is made whether the splitter switch 50 is in the High or Low position. If the splitter switch 50 is in the Low position, then the protocol proceeds to step 626 and the destination gear is equal to the expected front box gear. On the other hand, if the splitter switch 50 is in the High position, then the protocol proceeds to step 628 and the destination gear is equal to the expected front box gear plus one. Then, the protocol ends at step 634. The same logic sequence using a comparison of neutral, partial or full engagement is executed if the lever is in the "fore" section of the pattern, as shown from the flow from step 618 to step 620 and from step 620 to step 622.

If in step 616 a determination was made that the shift lever is in the $1^{st}$/Rev position the protocol proceeds to step 620 and a determination is made whether the fore-aft position of the shift lever is in the partial fore position or the full fore position. If so, then the protocol proceeds to step 622 and a determination of the destination gear is made according to the position of the splitter switch as described above. If, however, the shift lever is not in the partial fore position or the full fore position in step 620, then the protocol proceeds to step 624 and a determination is made as to whether the splitter switch 50 is in the High or Low position. If the splitter switch 50 is in the Low position, then the protocol proceeds to step 630 and the destination gear is equal to the expected front box gear. On the other hand, if the splitter switch 50 is in the High position, then the protocol proceeds to step 632 and the destination gear is equal to the expected front box gear minus one. Then, the protocol ends at step 634.

As described above, the predication of the destination gear is based on the shift intent of the operator determined by the movement of the shift lever and the splitter switch or button. The predication of the destination gear and the shift intent is combined with conventional engine control protocols to allow the operator to perform a button or compound shift without manipulating the clutch or throttle pedal. The information relating to such movement is sensed by the appropriate sensors to control the engine synchronous speed.

Typically, engine control when the vehicle is in motion and upshifting is determined as follows. For automated transmission systems of the type having an engine controlled by the ECU over an electronic datalink of the type defined in the SAE J1922 or J1939 protocol, the engine is operated in a "predip" mode prior to disengagement of the existing ratio, in a "synchronizing" mode after a shift from the existing ratio into neutral, and in the "throttle recovery" mode immediately after engagement of the target gear ratio. In the "predip" mode, fueling is modulated to cause driveline torque reversals to relieve torque lock conditions. In the "synchronizing" mode, engine fueling is minimized, allowing engine and input shaft speeds to decay down to a synchronous speed for engaging the destination gear (ES=IS=OS*Destination Gear$_{RATIO}$). In the "throttle recovery" mode, engine fueling is managed to return engine speed and torque to the operator's current throttle pedal position. In the "follower" mode, the engine is operated such that engine fueling is modulated according to the operator's positioning of the throttle pedal.

In another aspect of the invention, the prediction of the destination gear is used in a protocol for engine control in the controller-assisted manually shifted vehicular transmission system 10. Referring now to FIGS. 7A and 7B, the protocol begins at step 700, and at step 702 a determination is made whether a splitter shift is in progress. If not, then the protocol ends at step 742. If a splitter shift is in progress, then the protocol proceeds to step 704 and a determination is made whether the clutch is disengaged or the low speed is latched, i.e., the transmission output shaft speed data used in the decision process is less than a minimum set point. Satisfying these conditions ensures the integrity of the speed signal. If the clutch is disengaged and low speed is latched, then the protocol proceeds to step 736, the engine is commanded to operate in a "follower" mode, and the protocol ends at step 742.

If in step 704 the clutch is not disengaged (i.e., the clutch is engaged) or low speed is not latched, then the protocol proceeds to step 706 and the engine is commanded to operate in a "predip" mode by use of standard engine "predip" protocols in step 708. The protocol then proceeds to step 710 and determines whether the current gear ratio is equal to zero. If not, then the protocol loops back to step 706 to command the engine to continue to operate in the "predip" mode until the current gear ratio is equal to zero. Once the current gear ratio is equal to zero, then the protocol proceeds to step 712 and determines whether the predicted front box gear is equal to the last engaged front box gear. If not, then a compound shift has been selected and the protocol proceeds to step 728 where the engine is commanded to operate in a "synchronize" mode. If the predicted front box gear is equal to the last engaged front box gear at step 712, than a button shift has been selected and the protocol proceeds to step 724.

At step 724, a determination is made whether the expected front box gear is equal to zero (shift lever is in neutral). If so, then a compound shift has been selected and the protocol proceeds to step 728 where the engine is commanded to operate in a "synchronize" mode. If the expected front box gear is not equal to zero at step 724, then the protocol proceeds to step 720 to determine whether the operator has moved the shift lever out of gear within a predetermined period of time, for example, a set point of approximately 200 msec. If the shift lever has moved within the predetermined period of time, then the protocol loops back to step 724 and the transmission system 10 continues to monitor the conditions of steps 720 and 724. If either condition is satisfied, then the intended shift is determined to be a compound shift, rather than a button shift. Once the expected front box gear is equal to zero at step 724, the protocol proceeds to step 728 where the engine is commanded to operate in a "synchronize" mode. If at step 720 the shift lever is not moved within the predetermined period of time, the protocol proceeds to step 726 and the engine is commanded to continue to operate in the "zero torque" mode. Then, the protocol proceeds to step 714 and the engine is commanded to operate in the "zero torque" mode.

As mentioned above, if at step 712 a determination was made that the front box gear is not equal to the last engaged front box gear, a compound shift is expected and the protocol proceeds to step 714. At step 714, a determination is made whether the predicted destination gear is greater than the last known gear, similar to steps 608–614 in FIG. 6A. If not, then a downshift has been selected and the protocol proceeds to step 716 and a determination is made whether a downshift is allowed, depending on whether the maximum engine speed would be exceeded to engage the destination gear based on the equation Target ES=OS*Destination Gear$_{RATIO}$. If so, then the protocol proceeds to step 728 and the engine is commanded to operate in a "synchronize mode". If not, then the protocol proceeds to step 718 and a determination is made whether an upshift is allowed. If not, then the protocol loops back to step 716 and a determination is made whether a downshift is allowed, depending on whether the minimum engine speed would be violated to engage the destination gear based on the equation Target ES=OS*Destination Gear$_{RATIO}$. If so, then the protocol loops back to step 716. At this point, the protocol will loop such that either a downshift or an upshift will be allowed until continuing to the next step. Thus, steps 716, 718 and 720 determine the type of engine control mode invoked by the transmission controller 48. During the determination of the type of engine control mode, the protocol at step 724 also continues to check whether the expected front box gear is equal to zero. If so, steps 714 through 718 are discontinued and a new destination gear is determined in accordance with FIG. 6B for a compound shift.

If in step 714, a determination is made that the destination gear is greater than the last known gear, and a determination has been made that the intended shift is a button shift, then in step 738, a determination is made that the current gear is equal to zero. If the condition of step 738 is satisfied, the protocol proceeds to step 740 and the engine is commanded to continue operating in a "zero torque" mode. A "zero torque" mode is a variation of the "synchronous" mode in which the transmission controller 48 overrides the engine governor control and decreases engine torque such that the engine torque approaches, and preferably reaches a zero torque allowing the engine to rapidly decelerate to the proper synchronous gear.

For an upshift, the protocol continues to loop between steps 738 and 740 until the existing gear is no longer equal to zero in step 738 (the splitter has engaged the "destination gear"). Now that the splitter is engaged and the destination gear is the "current gear", the protocol proceeds to step 732 and the engine is commanded to operate in a "throttle recovery" mode until complete, and then protocol proceeds to step 734 and a determination is made whether the "throttle recovery" mode is complete. If so, then the protocol proceeds to step 736 and the engine is commanded to operate in "follower" mode and ends at step 742.

If in step 716 a downshift is allowed, then the protocol proceeds to step 728 and the engine is commanded to operate in the "synchronize" mode. Then, the protocol proceeds to step 730 and a determination is made whether the current or existing gear is still equal to zero. If so, then the protocol loops back to step 728 while the current or existing gear is equal to zero. Once the current or existing gear is no longer equal to zero, the protocol proceeds to step 732 and the engine is commanded to operate in the "throttle recovery" mode until the "throttle recovery" mode is complete at step 734. Then, the engine is commanded to operate in the "follower" mode and then ends at step 742.

Figure 8:
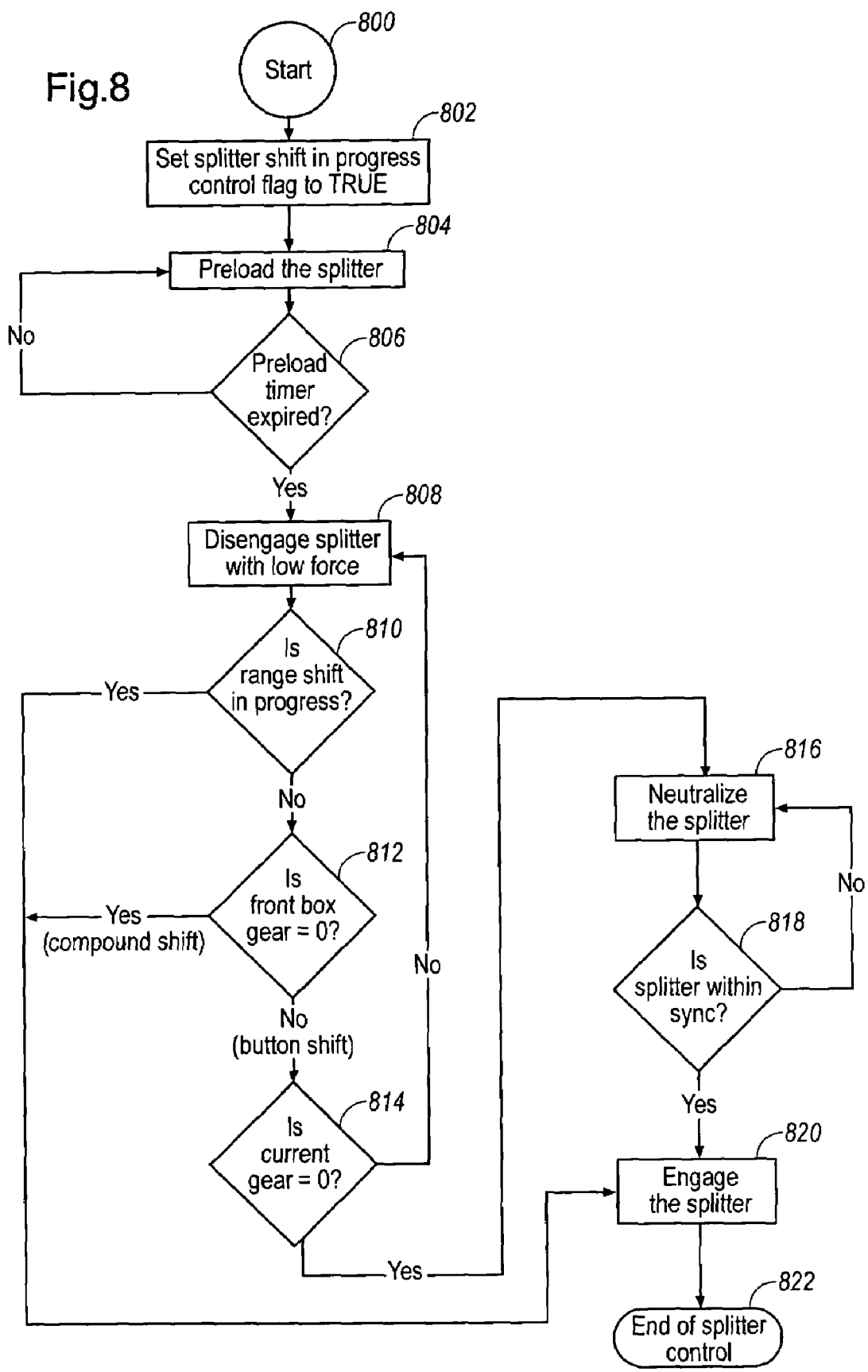
FIG. 8 is a schematic illustration, in flow chart format, of controlling the splitter according to yet another aspect of the present invention.

The prediction of the destination gear can be used for in a protocol for splitter control in the controller-assisted manually shifted vehicular transmission system 10, as shown in FIG. 8. The protocol starts at step 800, and at step 802 the splitter shift in progress control flag is set to TRUE. Then, the protocol proceeds to step 804 and the splitter is preloaded. Next, a determination is made at step 806 whether the preload has exceeded a predetermined amount of time. If so, then the protocol proceeds to step 808 and the splitter is disengaged with low force. Otherwise, the protocol loops back to step 804 and the splitter is preloaded.

Once the splitter is disengaged with low force in step 808, the protocol proceeds to step 810 and a determination is made whether a range shift is in progress. If so, then the protocol proceeds to step 820 and the splitter is engaged, and the protocol ends at step 822. If not, then the protocol proceeds to step 812 and a determination is made whether the front box gear is equal to zero. If so, then a compound shift has been selected and the protocol proceeds to step 820 and the splitter is engaged, and the protocol ends at step 822. If not, then a button shift is selected and the protocol proceeds to step 814 and a determination is made whether the current, existing gear is equal to zero. If not, then the protocol loops back to step 808 and the splitter is disengaged with low force. If so, then the protocol proceeds to step 816 and the splitter is neutralized.

Once the splitter is neutralized at step 816, the protocol proceeds to step 818 and a determination is made whether the splitter is synchronized. If so, then the protocol proceeds to step 820 and the splitter is engaged, and the protocol ends at step 822.

In yet another aspect of the invention, the prediction of the destination gear can be used in a protocol for range control in the controller-assisted manually shifted vehicular transmission system 10 is described. The protocol for range control can be, for example, a standard or a conventional range control protocol.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method for predicting a destination gear in a controller-assisted, manually shifted vehicular transmission system, said method comprising the steps of:
   determining an expected front box gear; and
   determining whether an intended shift is a compound shift, and if so, a destination gear is predicted based on a shift lever lateral position, both a partial and a full shift lever fore-aft position, and a splitter switch position.

2. The method of claim 1, whereby the destination gear is equal to the expected front box gear when the splitter switch position is in a Low position, the shift lever fore-aft position is in one of a partial aft position and a full aft position, and the shift lever lateral position is in one of a High position and a Center position.

3. The method of claim 1, whereby the destination gear is equal to the expected front box gear when the splitter switch position is in a Low position, the shift lever fore-aft position is in one of a partial fore position and a full fore position, and the shift lever lateral position is in $1^{st}$/Reverse position.

4. The method of claim 1, whereby the destination gear is equal to the expected front box gear when the splitter switch position is in a Low position, the shift lever fore-aft position is not in one of a partial fore position and a full fore position, and the shift lever lateral position is in $1^{st}$/Reverse position.

5. The method of claim 1, whereby the destination gear is equal to the expected front box gear plus one when the splitter switch position is in a High position, the shift lever fore-aft position is in one of a partial aft position and a full aft position, and the shift lever lateral position is in one of a High position and a Center position.

6. The method of claim 1, whereby the destination gear is equal to the expected front box gear plus one when the splitter switch position is in a High position, the shift lever fore-aft position is in one of a partial fore position and a full fore position, and the shift lever lateral position is in a $1^{st}$/Reverse position.

7. The method of claim 1, whereby the destination gear is equal to the expected front box gear minus one when the splitter switch position is in a High position and the shift lever fore-aft position is not in one of a partial fore position and a full fore position, and the shift lever lateral position is in a $1^{st}$/Reverse position.

8. The method of claim 1, whereby the intended shift is determined to be a compound shift based on the shift lever fore-aft position and the splitter switch position.

9. The method of claim 1, whereby the controller uses the predicted destination gear for engine control.

10. The method of claim 9, further comprising the step of determining whether the predicted destination gear is greater than a last known gear.

11. The method of claim 10, further comprising the step of determining whether a current gear is equal to zero when the predicted destination gear is greater than the last known gear, and if so, commanding the engine to a zero torque mode, and if not, commanding the engine to a recovery mode.

12. The method of claim 10, further comprising the step of determining whether a downshift is allowed when the predicted destination gear is not greater than the last known gear.

13. The method of claim 12, further comprising the step of commanding the engine to a synchronize mode when the downshift is allowed.

14. The method of claim 13, further comprising the step of determining whether a current gear is equal to zero, and if not, commanding the engine to a recovery mode.

15. The method of claim 14, whereby the engine is commanded to a follower mode when the recovery mode is complete.

16. The method of claim 1, whereby the controller uses the predicted destination gear for splitter control.

17. A controller-assisted, manually shifted vehicular transmission system comprising an internal combustion engine driving an input shaft of a compound transmission having a multiple-ratio main section shifted by a shift lever manually movable in a shift pattern and a splitter auxiliary section connected in series with said main section, a splitter shift mechanism for automatically implementing splitter shifts and a controller for receiving input signals indicative of system operating conditions and for processing same according to predetermined logic rules to issue command output signals to system actuators, including said splitter shift mechanism,
   wherein said controller includes logic rules for:
   determining an expected front box gear; and
   determining whether an intended shift is a compound shift, and if so, a destination gear is predicted based on a shift lever lateral position, both a partial and a full shift lever fore-aft position, and a splitter switch position.

18. The transmission of claim 17, wherein the controller determines the intended shift to be a compound shift based on the shift lever fore-aft position and the splitter switch position.

19. The transmission of claim 17, wherein the controller uses the predicted destination gear for engine control.

20. The transmission of claim 17, wherein the controller uses the predicted destination gear for splitter control.

* * * * *